United States Patent
Daly, Jr. et al.

(10) Patent No.: US 7,562,171 B2
(45) Date of Patent: Jul. 14, 2009

(54) METHOD FOR INTERFACING COMPONENTS OF A COMPUTING SYSTEM WITH A PAIR OF UNIDIRECTIONAL, POINT-TO-POINT BUSES

(75) Inventors: George W. Daly, Jr., Austin, TX (US); James S. Fields, Jr., Austin, TX (US); Donald G. Grice, Gardiner, NY (US); Thomas K. Heller, Jr., Rhinebeck, NY (US); Appoloniel N. Tankeh, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/854,004

(22) Filed: Sep. 12, 2007

(65) Prior Publication Data

US 2007/0300000 A1 Dec. 27, 2007

Related U.S. Application Data

(63) Continuation of application No. 11/304,474, filed on Dec. 15, 2005.

(51) Int. Cl.
*G06F 13/00* (2006.01)
*G06F 3/00* (2006.01)
*H04L 12/28* (2006.01)

(52) U.S. Cl. .................. 710/110; 710/41; 370/410
(58) Field of Classification Search .............. 710/110, 710/41; 370/410
See application file for complete search history.

(56) References Cited

U.S. PATENT DOCUMENTS

| | | | |
|---|---|---|---|
| 5,261,057 A | 11/1993 | Coyle et al. | |
| 5,828,903 A | 10/1998 | Sethuram et al. | |
| 6,026,448 A | 2/2000 | Goldrian et al. | |
| 6,256,693 B1 * | 7/2001 | Platko | 710/105 |
| 6,341,321 B1 | 1/2002 | Glassen et al. | |
| 6,356,693 B1 | 3/2002 | Shimizu et al. | |
| 6,466,993 B1 | 10/2002 | Bonola | |

(Continued)

OTHER PUBLICATIONS

F. Johnston et al., "IBM e-Server pSeries High Performance Switch", Performance White Paper, pp. 1-14 (Apr. 12, 2005).

*Primary Examiner*—Khanh Dang
*Assistant Examiner*—Christopher A Daley
(74) *Attorney, Agent, or Firm*—John Campbell, Esq.; Kevin P. Radigan, Esq.; Heslin Rothenberg Farley & Mesiti P.C.

(57) ABSTRACT

A method of interfacing two components of a computing system is provided wherein the method includes providing a pair of unidirectional, point-to-point buses to transmit data between a master bus controller of the computing system and a slave bus controller of a processor unit of the computing system. The method also includes providing means for transmitting a command packet with an address associated with data pertaining to the command from the master bus controller to the slave bus controller. In addition, the method includes providing means for determining by the slave bus controller whether the slave bus controller can accept the command. The method further includes providing means for transmitting an acknowledgement from the slave bus controller to the master bus controller after the slave bus controller receives a first signaling interval for the command packet if the slave bus controller can accept the command packet.

9 Claims, 10 Drawing Sheets

U.S. PATENT DOCUMENTS

| | | |
|---|---|---|
| 6,564,271 B2 | 5/2003 | Micalizzi, Jr. et al. |
| 6,581,116 B1 * | 6/2003 | Arimilli et al. ............... 710/110 |
| 6,751,684 B2 * | 6/2004 | Owen et al. .................... 710/29 |
| 6,751,695 B1 * | 6/2004 | Jirgal ......................... 710/305 |
| 6,754,782 B2 | 6/2004 | Arimilli et al. |
| 6,785,751 B1 | 8/2004 | Connor |
| 6,799,200 B1 | 9/2004 | Blackmore et al. |
| 6,928,500 B1 * | 8/2005 | Ramanujan et al. ......... 710/107 |
| 7,062,587 B2 | 6/2006 | Zaidi et al. |
| 7,206,897 B2 * | 4/2007 | Perego et al. ................ 711/105 |
| 2002/0099879 A1 | 7/2002 | Bayer et al. |
| 2003/0237041 A1 | 12/2003 | Cole et al. |
| 2006/0256814 A1 * | 11/2006 | Caci ........................... 370/466 |

* cited by examiner

METHOD FOR INTERFACING COMPONENTS OF A COMPUTING SYSTEM WITH A PAIR OF UNIDIRECTIONAL, POINT-TO-POINT BUSES

CROSS-REFERENCE TO RELATED APPLICATION

This application is a continuation of U.S. patent application Ser. No. 11/304,474, filed Dec. 15, 2005, and published Jun. 21, 2007 as U.S. Patent Publication No. US/2007-0143511 A1, entitled "Method and System for Interfacing Components of a Computing System with a Pair of Unidirectional, Point-to-Point Buses", by Daly et al., the entirety of which is hereby incorporated herein by reference.

TECHNICAL FIELD

This invention relates in general to interfacing components of a computing system and, more particularly, to providing a pair of unidirectional, point-to-point buses to transmit data between two components of a computing system.

BACKGROUND OF THE INVENTION

In high-performance computing systems, a plurality of independent servers, processor nodes, or processor units provide a distributed architecture that is capable of parallel computing operations. Such distributed computing requires that the servers, processor nodes, or processor units communicate with one another. These independent computing nodes of a high-performance computing system may be connected to one another through a switch. In IBM® pSeries® computing systems, a server, processor node, or processor unit may be connected to a switch through a communications adapter via an input/output (I/O) port of the server, processor node, or processor unit. (The marks IBM and pSeries are registered trademarks of International Business Machines Corporation, Armonk, N.Y.) Each server or processor node may include a plurality of central processing units working together and sharing cache memory.

As processor clock speeds have increased and the data communications rate between the communications adapters and switches have increased, the I/O bus has become a bottleneck that hinders improved performance in such high performance computing systems. Increasing the speed of a processor unit's I/O bus by simply increasing the width and signaling rate of the bus has the disadvantages of being expensive and complex because of physical factors such as the following: the length of the bus, the number of devices that can be fabricated on a chip, chip pin-count limitations, power consumption considerations, and the speed of available error correction systems. For example, one known I/O bus solution simply increases the bus width and provides separate, dedicated buses for address and data transmission. In this solution, the I/O bus' control information takes a different path from the data payload. Although this I/O bus solution increases bandwidth, the cost of implementation is high, and the utilization of the bus system as a whole is relatively very low. Therefore, there is a need for an I/O bus that provides an increased data throughput rate.

There is also a need for an I/O bus to support a wide range of I/O devices, I/O bridges to the standard PCI bus, and other high-speed adapters like IBM® pSeries® High-Performance-Switch-based adapters and Infiniband-based adapters. These I/O components have a wide spectrum of latency and bandwidth requirements. This can lead to conflicting performance requirements. For example, a communications adapter generally requires a fast response time when it issues a Direct Memory Address (DMA) request to a memory component so that the adapter can determine when to reuse a sequence number in a tag field that keeps a record of outstanding DMA requests. On the other hand, to sustain high DMA transfer rate, it is very desirable to maximize the request issue rate. Using existing I/O buses, the number of DMA requests that are retried by the I/O controller increases with an increase in the rate at which the adapter is issuing the DMA requests. As a result, the increase in the number of retries causes an increase the response time and a decrease in the throughput of the bus. Therefore, there is also a need for an I/O bus that provides an increased data throughput rate and reduced latency.

SUMMARY OF THE INVENTION

In one aspect, the shortcomings of the prior art are overcome and additional advantages are provided through the provision of a method of interfacing two components of a computing system, wherein the method includes providing a pair of unidirectional, point-to-point buses to transmit data between a master bus controller of the computing system and a slave bus controller of a processor unit of the computing system. The pair of unidirectional, point-to-point buses comprises a unidirectional, point-to-point output bus to transmit data from the master bus controller to the slave bus controller and a unidirectional, point-to-point input bus to transmit data from the slave bus controller to the master bus controller, wherein the master bus controller initiates a transmission of the data between the master bus controller and the slave bus controller. The master bus controller is coupled to a component of the computing system, and the slave bus controller is coupled to a component of the processor unit of the computing system.

The method also includes providing means for transmitting a command packet comprising a command and an address associated with data pertaining to the command from the master bus controller to the slave bus controller on the output bus. In addition, the method comprises providing means for determining by the slave bus controller whether the slave bus controller can accept the command. The method further comprises providing means for transmitting an acknowledgement from the slave bus controller to the master bus controller via the input bus after the slave bus controller receives a first signaling interval for the command packet on the output bus if the step of determining indicates that the slave bus controller can accept the command packet.

In another aspect of the present invention, the command packet further comprises a block of data, and the transmission of the command packet spans a plurality of signaling intervals of the output bus. In addition, the method further comprises providing means for utilizing a signal link of the output bus to transmit a bit of the address in a signaling interval of the plurality of signaling intervals and providing means for utilizing the signal link to transmit a bit of the block of data in another signaling interval of the plurality of signaling intervals.

System products corresponding to the above-summarized methods are also described and claimed herein.

Additional features and advantages are realized through the techniques of the present invention. Other embodiments and aspects of the invention are described in detail herein and are considered a part of the claimed invention.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
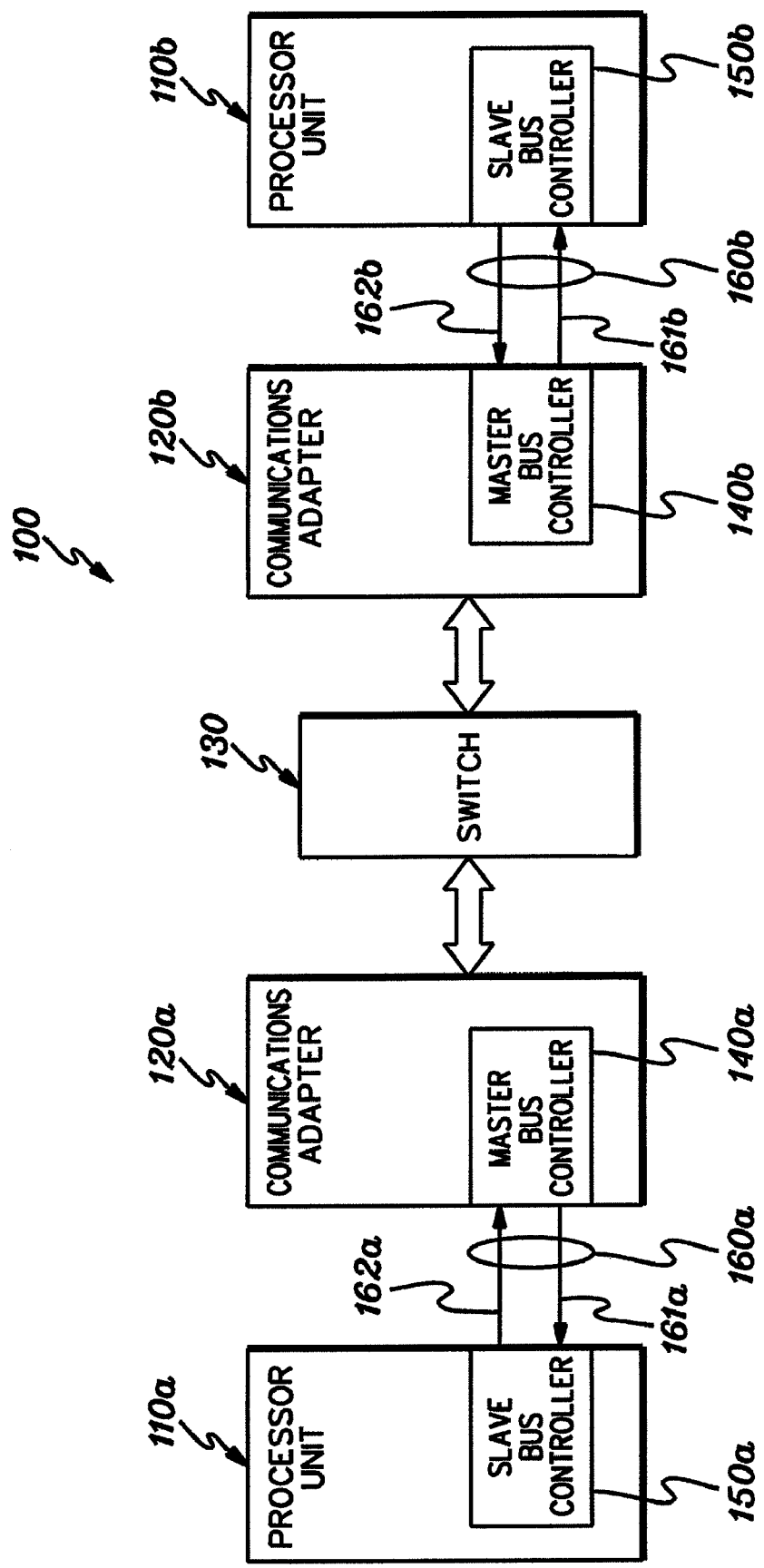
FIG. 1 illustrates a computing environment employing a pair of unidirectional, point-to-point buses, in accordance with an aspect of the present invention.
Figure 2:
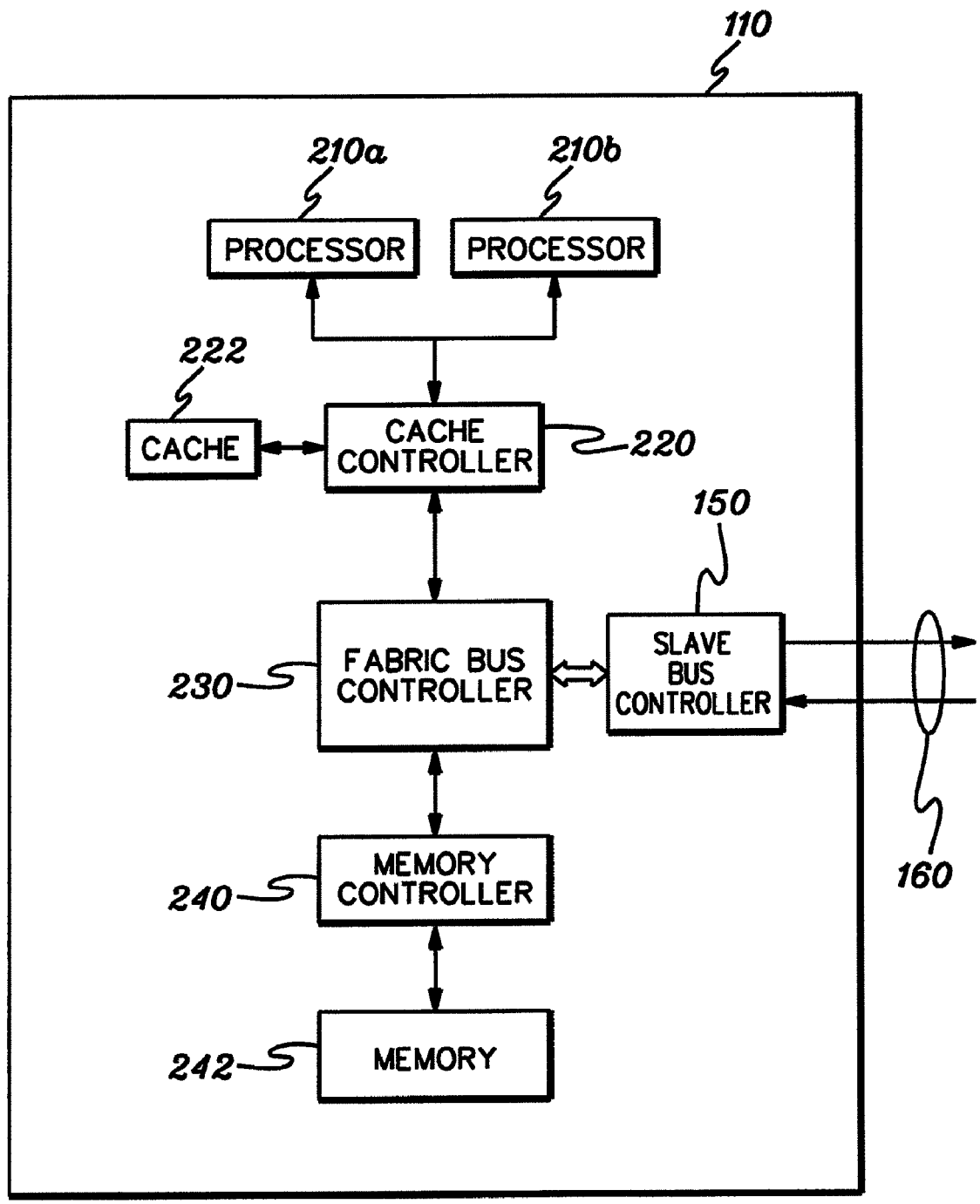
FIG. 2 illustrates one embodiment of the processor unit of FIG. 1, in accordance with an aspect of the present invention.

In one aspect, the present invention provides a method and system for interfacing two components of a computing system. The interface comprises a pair of unidirectional, point-to-pint buses for transmitting data between a master bus controller of a computing system and a slave bus controller of a computing node of the computing system. The pair of unidirectional, point-to-pint buses includes a unidirectional, point-to-point output bus to transmit data from the master bus controller to the slave bus controller and a unidirectional, point-to-point input bus to transmit data from the slave bus controller to the master bus controller. The master bus controller is coupled to one component of the computing system, and the slave bus controller is coupled to another component of the computing system. For example, as illustrated in FIG. 1, master bus controller 140a is coupled to communications adapter 120a of computing system 100. Slave bus controller 150a is coupled to processor unit 110a of the computing system. As shown in FIG. 2, the slave bus controller may be coupled to a component of the processor unit.

FIG. 1 illustrates a computing environment employing a pair of unidirectional, point-to-point buses for communicating data between two components of a computing system, in accordance with an aspect of the present invention. In computing system 100, processor units 110a and 110b comprise slave bus controllers 150a and 150b, respectively, and communications adapters 120a and 120b comprise master bus controllers 140a and 140b, respectively. Communications adapter 120a and processor unit 110a communicate data using bus pair 160a via master bus controller 140a and slave bus controller 150a. As illustrated in FIG. 1, bus pair 160a comprises output bus 161a and input bus 162a. Output bus 161 is a unidirectional, point-to-point bus for transmitting data from master bus controller 140a to slave bus controller 150a, and input bus 162a is a unidirectional, point-to-point bus for transmitting data from slave bus controller 150a to master bus controller 140a. Similarly, communications adapter 120b communicates data with processor unit 110b utilizing bus pair 160b, which comprises unidirectional, point-to-point output bus 161b and unidirectional, point-to-point input bus 162b, via master bus controller 140b and slave bus controller 150b. Since communications adapters 120a and 120b are coupled to switch 130, processor unit 110a may transmit data to or receive data from processor unit 110b. Also, because two-way data communications are provided, processor units 110a and 110b may utilize an application layer protocol such as the Message Passing Interface (MPI) to effect a clustered computing system, for example.

FIG. 2 illustrates one embodiment of the processor units 110a and 110b of FIG. 1, in accordance with an aspect of the present invention. Processor unit 110 comprises processor 210a and processor 210b, which are coupled to cache controller 220. Processors 210a and 210b access cache 222 of processor unit 110 through cache controller 220. If the data sought by one of the processors of processor unit 110 is not available in cache 222, the cache controller may attempt to obtain the requested data from memory 242 via memory controller 240 by making a read request to memory controller 240 through fabric bus controller 230. Fabric bus controller couples cache controller 220, memory controller 240, and slave bus controller 150 of processor unit 110. Therefore, components of processor unit 110 may access data from or provide data to another component of the computing system that is external to processor unit 110 through fabric bus controller 230, slave bus controller 150, and bus pair 160. For example, as illustrated in FIG. 1, a component of processor unit 110a can transmit data to a component of processor unit 110b in this way.

Figure 3:
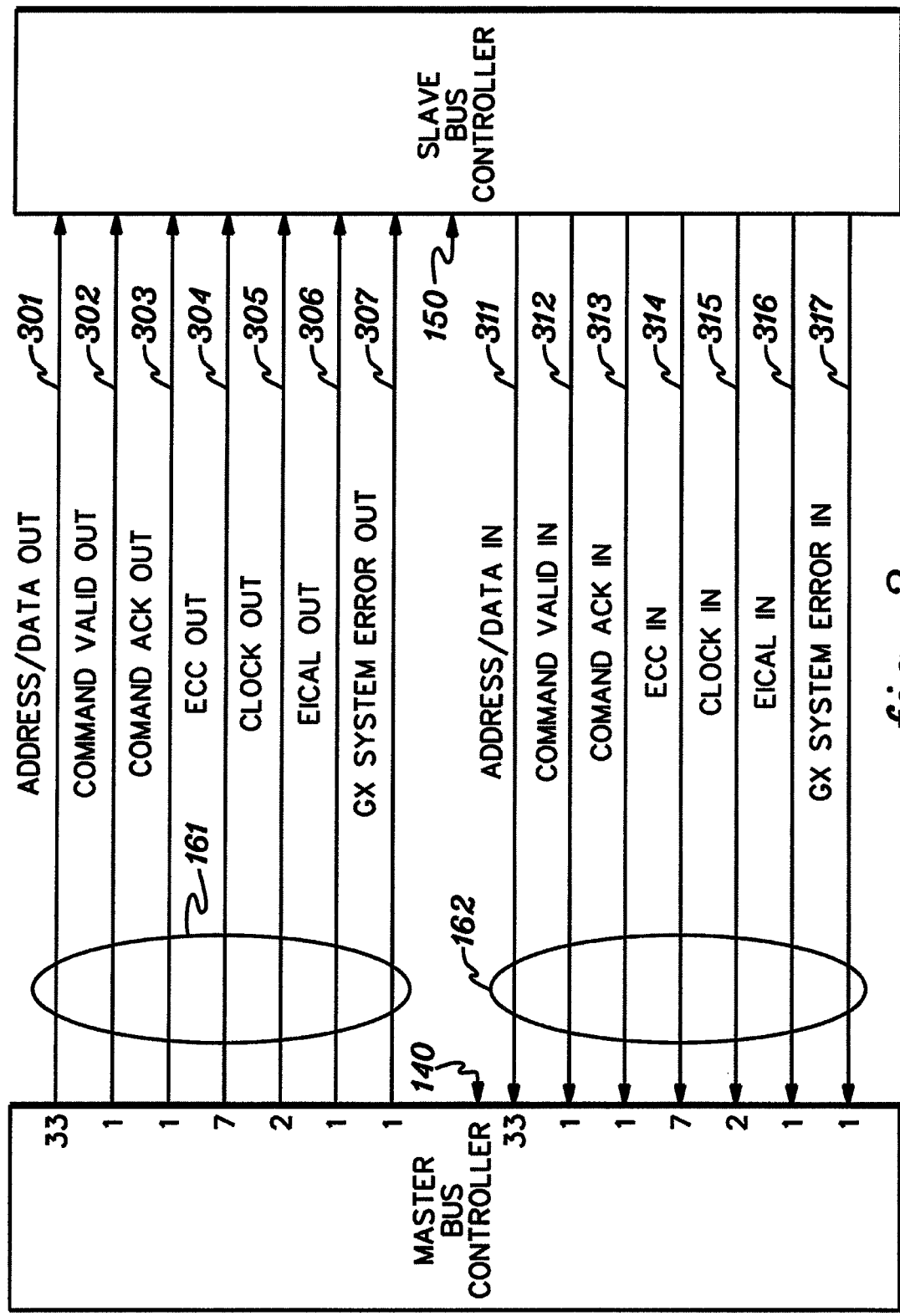
FIG. 3 illustrates one embodiment of the pair of unidirectional, point-to-point buses between the master bus controller and slave bus controller of FIG. 1, in accordance with an aspect of the present invention.

FIG. 3 illustrates one embodiment of the pair of unidirectional, point-to-point buses between master bus controller 140 and slave bus controller 150, in accordance with an aspect of the present invention. In FIG. 1, master bus controllers 140a and 140b and slave bus controllers 150a and 150b may be instances of master bus controller 140 and slave bus controller 150, respectively. As illustrated in FIG. 3, unidirectional, point-to-point output bus 161 comprises address/data signal links 301, command valid signal link 302, command ACK signal link 303, ECC signal links 304, clock out signal link 305, EICAL out signal link 306, and bus system error out signal link 307. Address/data signal links 301 carry command packets transmitted my master bus controller 140. These command packets may include a command, an address associated with the command, and data pertinent to the command, for example. Signal link 305 carries a clock signal used by slave bus controller 150 to receive signals transmitted on output bus 161. Signal links 302, 303, 306, and 307 carry control signals of the protocol utilized by output bus 161. EICAL out signal link 306 is utilized periodically to control a calibration process to maintain the time synchronization of the address/data signal links 301 with clock out signal link 305, and bus system error out signal link 307 is used to signal that an uncorrectable bus error has been detected. ECC signal links 304 are utilized to signal the parity bits of an error correcting code that is applied to data transmitted on address/data signal links 301. In the example of FIG. 3, each block of thirty-two bits (or data word) transmitted on address/data out signal links 301 is protected by an error correcting code having seven parity bits.

Table 1 below provides the number of signal lines or signal links for each signal in one embodiment of the pair of unidirectional, point-to-point buses between the master bus controller and the slave bus controller, in accordance with an aspect of the present invention. Table 1 also provides a summary of the descriptions of the signals utilized by this pair of unidirectional, point-to-point buses.

input bus 162 may carry 4 bytes of data during a bus signaling interval, and the output and input buses run at one third of the processor frequency. In this embodiment, the master bus controller and the slave bus controller have eight write buffers and eight read buffers. Referring to FIG. 1, all commands from a communications adapter are transmitted on an output bus, and a response command from the target component for the command received by the master bus controller on an input bus is forwarded to the communications adapter. In this embodiment, a command from communications adapter 120a such as a DMA Read command requires three bus signaling intervals or nine processor clock cycles (9 pclocks) because a bus clock cycle is three times the period of the processor clock.

Figure 4:
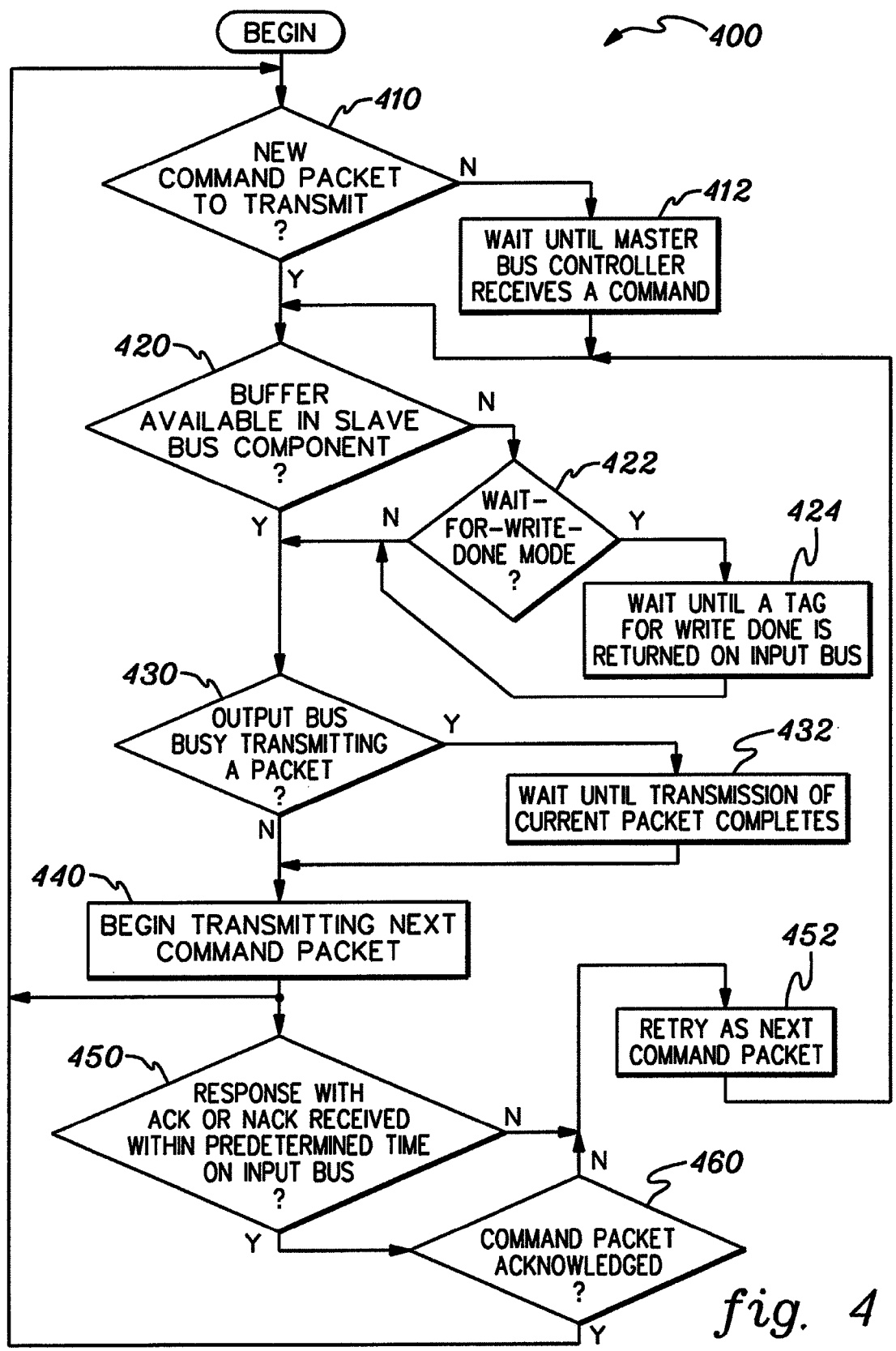
FIG. 4 illustrates a flowchart of one aspect of the protocol utilized by the master bus controller of FIG. 3, in accordance with an aspect of the present invention.

FIG. 4 illustrates flowchart 400 for a protocol utilized by master bus controller 140 of FIG. 3 to transmit command packets on the output bus, in accordance with an aspect of the present invention. This protocol begins with determining whether the master bus controller has a new command packet to transmit (step 410). If there is a new command packet to transmit, the master bus controller determines whether a buffer is currently available in the slave bus controller (step 420). However, if there is not a new command packet to

TABLE 1

| Signal Names | Number of Signal Lines | Description |
| --- | --- | --- |
| Address/Data Out | 33 | Address or data and control information |
| Command Valid Out | 1 | Indicates start of a command packet |
| Command Acknowledge Out | 1 | Positive acknowledge for command received on Address/Data In bus |
| ECC Out | 7 | ECC for Address/Data, Command Valid, and Command Acknowledge |
| Clock Out | 2 | Differential clock to the bridge chip |
| EICal Out | 1 | Elastic Interface Calibration signal |
| GX System Error Out | 1 | GX Bus Error Signal |
| Address/Data In | 33 | Address or data, and control information |
| Command Valid In | 1 | Indicates start of a command packet |
| Command Acknowledge In | 1 | Positive acknowledge for command received on Address/Data Out bus |
| ECC In | 7 | ECC for Address/Data. Command Valid, and Command Acknowledge |
| Clock In | 2 | Differential clock returned to the processor node |
| EICal In | 1 | Elastic Interface Calibration signal |
| GX System Error In | 1 | GX Bus Error Signal |

For example, command valid signal link 302 is utilized to mark the first data word of a command packet transmitted on address/data signal links 301. Command ACK out signal link 303 is used by the master bus controller to acknowledge a response command received previously on input bus 162.

Similarly, unidirectional, point-to-point input bus 162 comprises address/data signal links 311, command valid signal link 312, command ACK signal link 313, ECC signal links 314, clock out signal link 315, EICAL out signal link 316, and bus system error out signal link 317. The signal links of input bus 162 have functions analogous to those described above for the correspondingly-named signal links of output bus 161.

In one embodiment, output bus 161 and input bus 162 are high-frequency point-to-point unidirectional multiplex address/data buses. Including a clock signal link in the output and input buses facilitates transmitting at high rates where the bus signaling interval may be less than the signal propagation time on the bus. The output bus is controlled by master bus controller 140, and the input bus is controlled by slave bus controller 150. In example of FIG. 3, the output bus 162 and transmit, the master bus controller waits until it receives a command to transmit before proceeding to the test of step 420.

In one embodiment, the master bus controller employs the following technique to determine whether the slave bus controller has an available buffer. The master bus controller includes a tag in each command packet transmitted on the output bus. Each tag transmitted by the master bus controller corresponds to a buffer of the slave bus controller that is in use as a result of a command packet transmitted by the master bus controller. When the slave bus controller has completed the task requested by the command included in the command packet, the slave bus controller transmits a response command packet, which includes the tag, on the input bus. The master bus controller keeps track of the number of write-command tags and read-command tags that are outstanding. When the master bus controller receives a response command packet comprising a tag returned by the slave bus controller, the number of outstanding write-command tags or read-command tags is reduced by one. If the number of outstanding tags of the appropriate type for the new command is less than the number of buffers of that type in the slave bus controller, a buffer is available in the slave bus component, and protocol processing continues with step 430.

In step 430, the master bus controller determines whether the output bus is busy transmitting a prior command packet. If the output bus is not busy, the master bus controller begins to transmit the next command packet (step 440). Otherwise, the master bus controller waits until transmission of the current packet completes (step 432), and then begins to transmit the next command packet on the output bus in step 440. The master bus controller proceeds back to step 410 to determine whether there is a new command packet to transmit. Concurrently, the master bus controller checks whether a response command for a transmitted command packet received within a predetermined time on the input bus in step 450.

If the master bus controller does not receive a response command packet from the slave bus controller within the predetermined time, transmission of the packet is to be retried, and the packet is designated as the next command packet in step 452. Alternatively, if the master bus controller receives a response command packet corresponding to a transmitted command packet within the predetermined time, the master bus controller determines in step 460 whether the command was acknowledged or not acknowledged in the response command received on the input bus from the slave bus controller. If the command was not acknowledged, as indicated by a NACK in the control information included with the response packet, for example, the command packet is designated for transmission again (step 452), and protocol control processing of the master bus controller returns to step 420. Instead, if the command packet is acknowledged as determined in step 460, protocol control processing returns to step 410 to determine whether there is a new command packet to transmit. The master bus controller may process more than one step in the protocol flowchart 400 concurrently.

Figure 5:
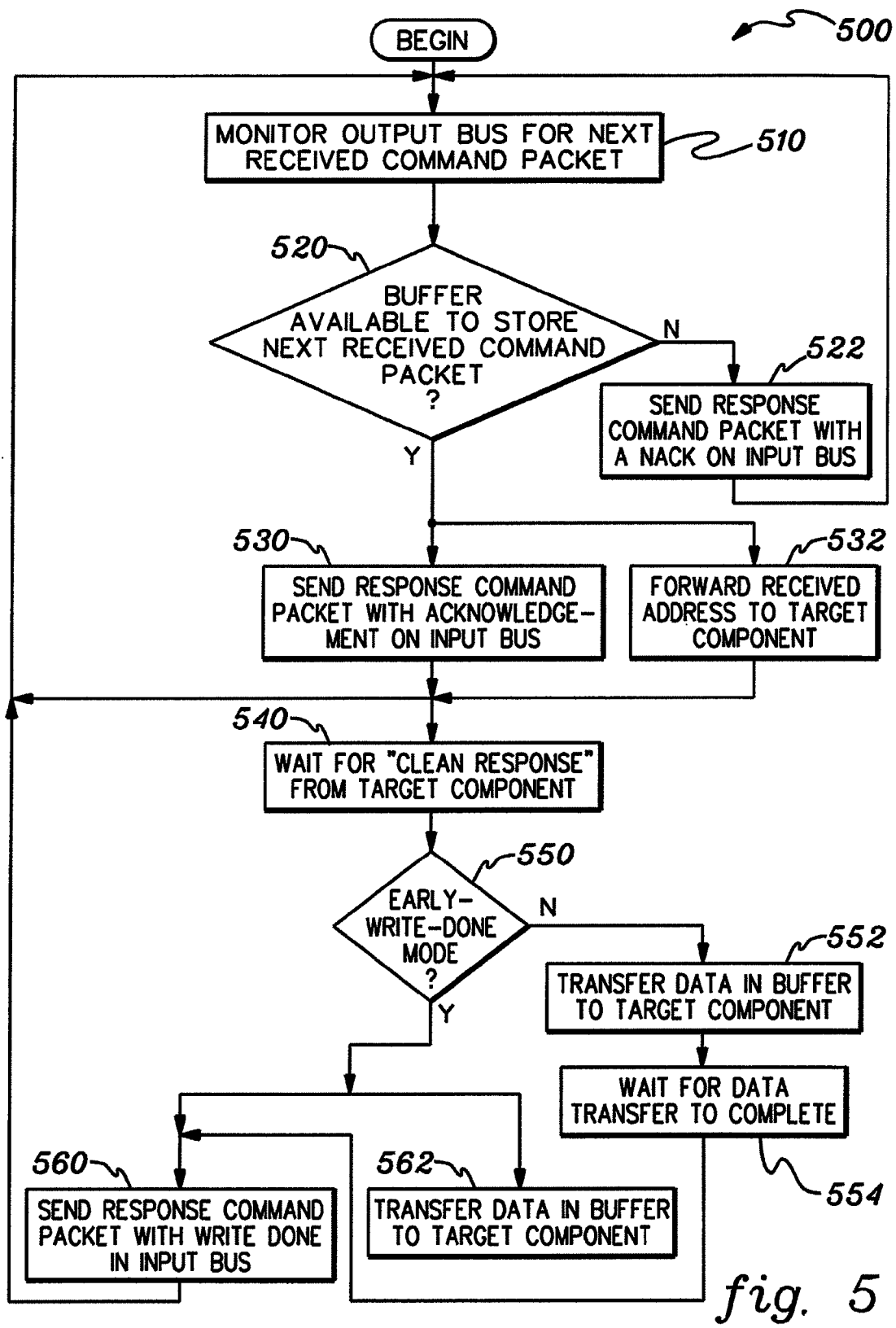
FIG. 5 illustrates a flowchart of one aspect of the protocol utilized by the slave bus controller of FIG. 3, in accordance with an aspect of the present invention.

FIG. 5 illustrates flowchart 500 for a protocol utilized by slave bus controller 150 of FIG. 3 to transmit response command packets on the input bus, in accordance with an aspect of the present invention. This protocol begins with the slave bus controller monitoring the output bus for the next received command packet from the master bus controller in step 510. When the first word of a command packet is received, the slave bus controller determines whether there is a buffer available to store the next received command packet, which is currently being received. If no buffer is available, the slave bus controller sends a response command packet with a not-acknowledge (NACK) control signal on the input bus in step 522, and the protocol processing returns to step 510 to monitor the output bus for the next received command packet. Alternatively, if a buffer is available to store the next received command packet, the slave bus controller sends a response command packet with an acknowledgement (ACK) control signal on the input bus (step 530) and concurrently forwards the received address information to the target component of the command included in the received command packet (step 532). Forwarding the address information when it is received, rather than after the slave bus controller has received the data that follows the address in a write command, has the effect of reducing the busy time of the slave bus controller's buffers and reducing the total response time to the write command.

After executing steps 530 and 532, the slave bus controller concurrently executes two protocol processing paths illustrated in flowchart 500. On one path, processing returns to step 510 wherein the slave bus controller monitors the output bus for the next received command packet, and on the other path the slave bus controller waits to receive a CLEAN RESPONSE control signal from the target component (step 540). After receiving a CLEAN RESPONSE control signal from the target component, the slave bus controller determines whether the bus controller is configured to operate in early-WRITE-DONE mode in step 550. If the slave bus controller is configured to operate in early-WRITE-DONE mode, the slave bus controller sends a response command packet with a WRITE DONE control signal on the input bus in step 560. Concurrently, the slave bus controller transfers data, which has been received in the command packet and stored in a buffer in the slave bus controller, to the target component in step 562. After sending a response command in step 560, protocol control processing returns to step 510 wherein the slave bus controller monitors the output bus for the next received command packet received.

However, if the slave bus controller is not configured to operate in early-WRITE-DONE mode, protocol processing proceeds from step 550 to step 552 in which the slave bus controller transfers data, which has been received in the command packet and stored in a buffer in the slave bus controller, to the target component. The slave bus controller waits for the data transfer to the target component to complete in step 554 before proceeding to step 560 to send response command packet with a WRITE DONE control signal to the master bus controller on the input bus.

Figure 6:
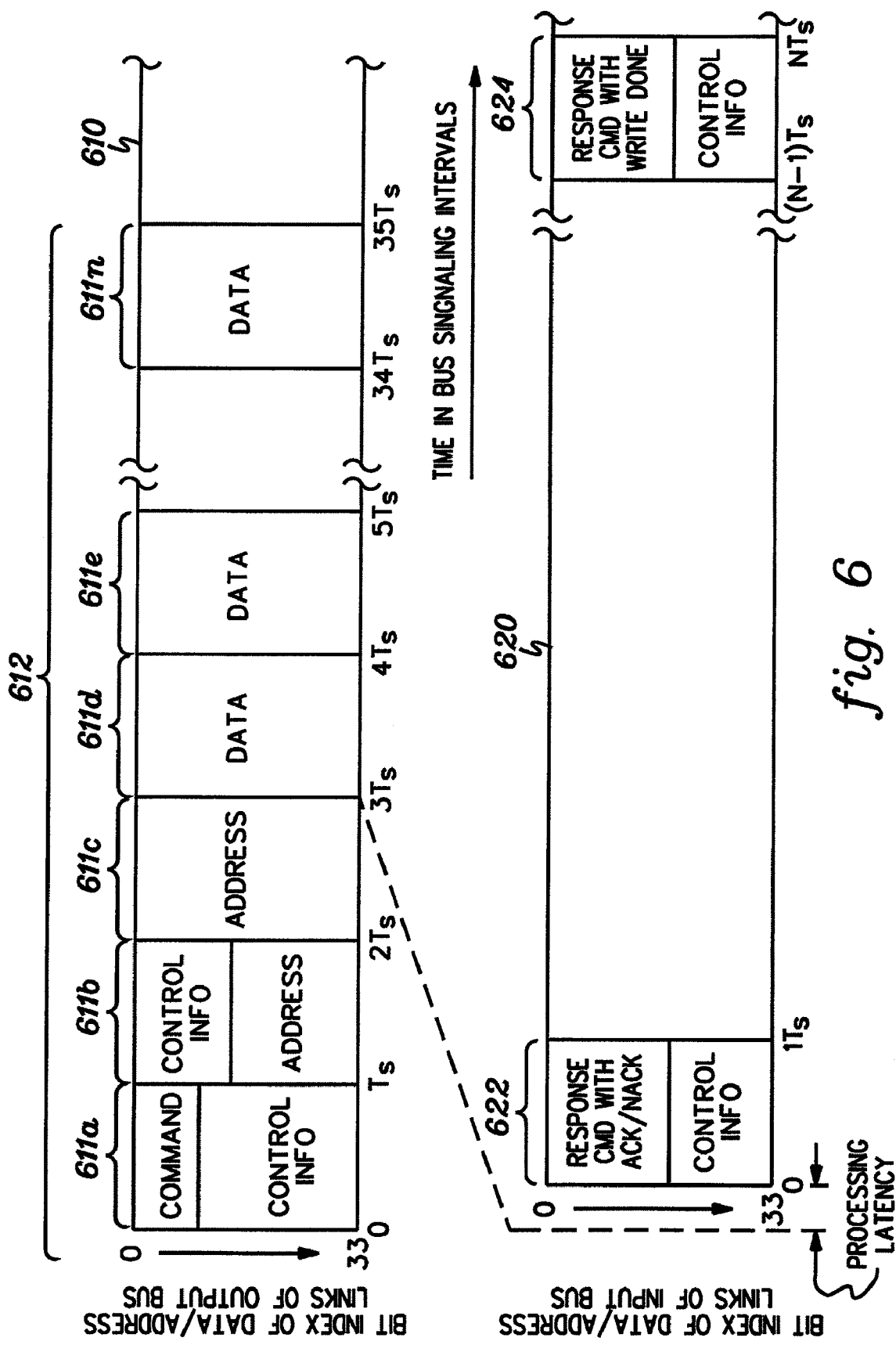
FIG. 6 illustrates an example of data packets transmitted by the master bus controller and slave bus controller to write data from the master bus controller to the slave bus controller, in accordance with an aspect of the present invention.

FIG. 6 illustrates an example of data packets transmitted by the master bus controller and slave bus controller on output bus 161 and input bus 162 of bus pair 160 in FIG. 3 to write data from the master bus controller to the slave bus controller, in accordance with an aspect of the present invention. The sequence of data words 610 transmitted on address/data signal links 301 from master bus controller 140 to slave bus controller 150 includes command packet 612, which comprises data words 611a, 611b, 611c, 611d, 611e through 611n. The number of data words in command packet 612 is determined by the number of bits of data to be transmitted from the master bus controller to the slave bus controller. In one exemplary system computing system, the amount of data in a command packet is the data stored in one line of cache.

In the example of FIG. 6, the data words are partitioned by bit index into fields that may carry different types of information during different bus signaling intervals in one bus protocol embodiment in accordance with an aspect of the present invention. During the first bus signaling interval of a command packet transmission in this embodiment, data word 611a of command packet 612 includes command and control information. During the second bus signaling interval, data word 611b includes more control information and part of the address associated with the data to be transmitted from the master bus controller to the slave bus controller. Data word 611c, which is transmitted during the third output bus signaling interval, carries the remainder of the bits that address specify the address associated with the data to follow in subsequent data words of the command packet. The remaining data words of command packet 612, data words 611d through 611n, comprise data associated with the write command.

In response to the command packet received by the slave bus controller when the master bus controller writes data to the slave bus controller, the sequence of data words 620 transmitted on address/data signal links 311 from slave bus controller 150 to master bus controller 140 on the input bus includes response command packet 622 and response command packet 624. As shown in FIG. 6, the slave bus controller transmits response command packet 622, including a response command with an ACK or NACK signal, and control information, after the slave bus controller has received the portion of command packet 612 that includes the command, control information, and the address associated with the command. In a subsequent input bus signaling interval, the slave bus controller transmits response command packet 624, including a response command with a WRITE DONE signal, and control information. The input bus signaling interval in which response command packet 624 is transmitted is determined by the slave bus controller's protocol illustrated in flowchart 500 of FIG. 5 and depends on the time required to receive a CLEAN RESPONSE from the target component, whether the slave bus controller is configured to issue an early WRITE DONE signal, and possibly the time needed to transfer data in the slave bus controller's buffer to the target component.

Figure 7:
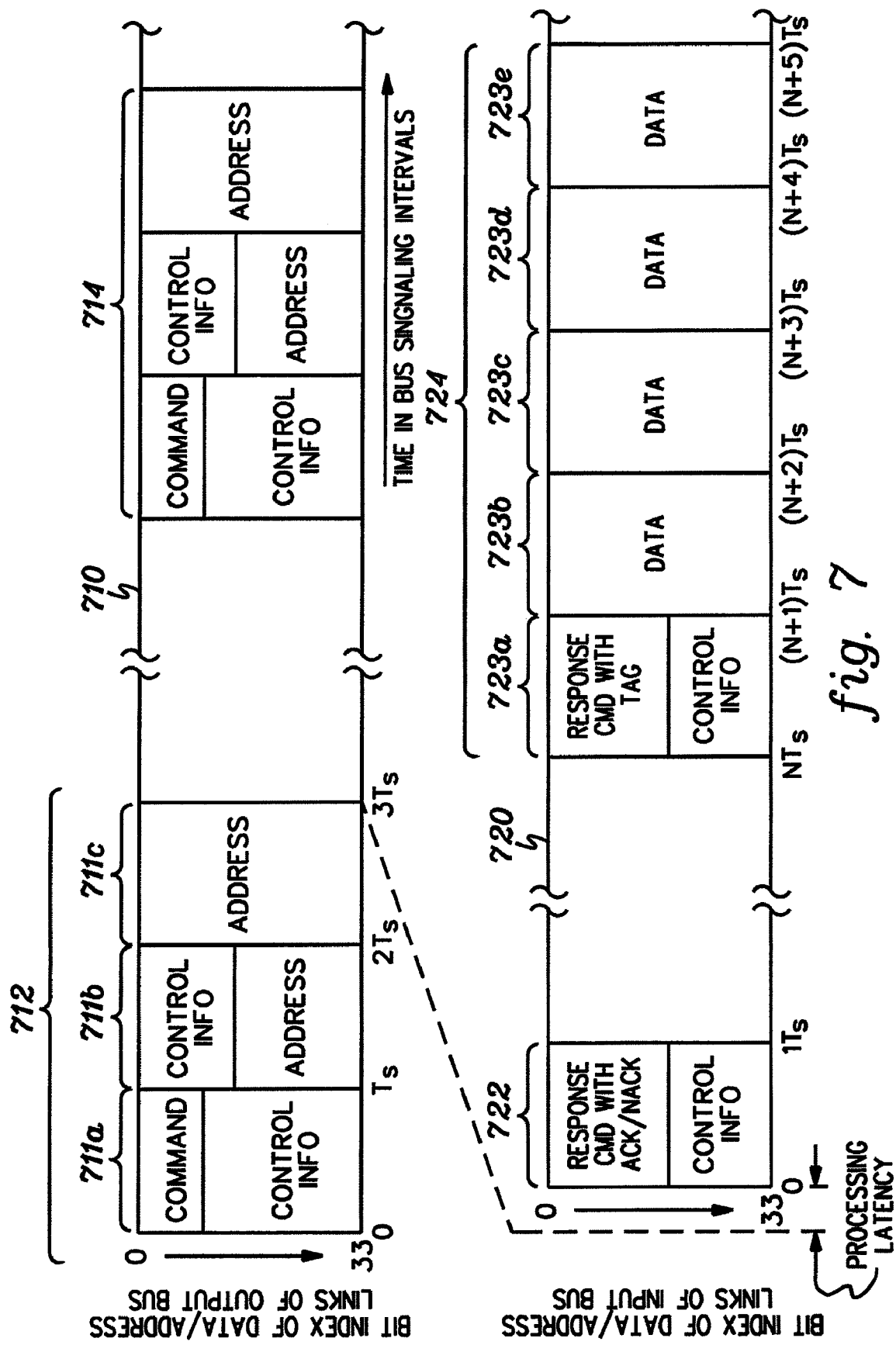
FIG. 7 illustrates an example of data packets transmitted by the master bus controller and slave bus controller for the master bus controller to read data from the slave bus controller, in accordance with an aspect of the present invention.

FIG. 7 illustrates an example of data packets transmitted by the master bus controller and slave bus controller on output bus and input bus of bus pair for the master bus controller to read data from the slave bus controller, in accordance with an aspect of the present invention. The master bus controller initiates the reading of data from a target component coupled to the slave bus controller by transmitting a command packet that includes a read command on the output bus. In the example illustrated in FIG. 7, sequence of data words 710 transmitted on address/data signal links 301 in FIG. 3 from master bus controller to slave bus controller includes command packet 712, which comprises data words 711a, 711b, and 711c, followed by command packet 714 sent to convey a subsequent command to the slave bus controller. In this exemplary signaling protocol, three data words are sufficient to transmit the read command, control information, and address associated with the read command.

In one embodiment of a bus-pair protocol in accordance with the present invention, sequence of data words 720 is transmitted on address/data signal links 311 of the input bus in FIG. 3 from the slave bus controller to the master bus controller in response to a read command received by the slave bus controller. Sequence of data words 720 comprises response command packet 722, which includes a response command with an ACK or NACK signal and control information, and response command packet 724, which includes a response command with the tag received from the master bus controller, control information, and the requested data. As shown in FIG. 7, response command packet 722 is transmitted on the input bus of the bus pair between the master bus controller and slave bus controller after the slave bus controller has received the command packet that includes a read command. Response command packet 724 is transmitted subsequently on the input bus after the slave bus controller receives the data requested from the target component of the read command. Response command packet 724 comprises data word 723a, including a response command and control information, and data words 723b, 723c, 723d, and 723e, which comprise the requested data from target component. In accordance with one aspect of the invention, command packet 712 includes a tag that is associated with the read command, and response command packet 724 includes the same tag. Among other functions, the tag returned with the requested data by the slave bus controller facilitates identification of the data of response command packet 724 by the master bus controller.

When transmitting a write command packet, the master bus controller does not wait to receive a WRITE DONE indication from the slave bus controller before preparing to send a command packet for the next DMA write request from the communications adapter. The communications adapter may send the next write request as soon as the command packet for the previous write request acknowledged by the slave bus controller, and the master bus controller may begin to transmit a command packet for this next write request on the output bus immediately after completing the transmission of the current command packet (for the previous write request). As long as the acknowledgement of a command packet is received by the master bus controller before all of the data of that command packet has been launched, the next command packet is transmitted immediately, and the full bandwidth of the output bus is utilized.

The ACK time is the time interval between the master bus controller commencing transmission a command packet and then master bus controller receiving an acknowledgement from the slave bus controller. A response command packet with the acknowledgement is transmitted after the slave bus controller has received the address information in a command packet received on the output bus. For an example of a computing system wherein a cache line stores 128 bytes, transmission of a command packet for a write request requires thirty-five bus signaling intervals if the address/data links of the output bus carry 4 bytes per data word (i.e. per signaling interval). However, the slave bus controller receives the address information after approximately three bus signaling intervals as illustrated in FIG. 6, and the response command packet with acknowledgement requires only one input bus signaling interval. Therefore, the ACK time is approximately four bus signaling intervals plus some processing latency. The ACK time for this example is substantially less than the command-packet-transmission time of thirty-five bus signaling intervals. As a result, the full bandwidth of the output bus can be utilized in this example.

Efficient utilization of bus bandwidth is also possible if the DMA write requests are ordered. The master bus controller utilizes a five-bit node identification field in the tag included in each command packet to maintain the required ordering of the write requests. Commands that have the same value in the node identification field are transmitted in the order received, but data for write commands having different node identification values are allowed to be written to a target component in a different order from which the respective write requests were received by the master bus controller.

Figure 8:
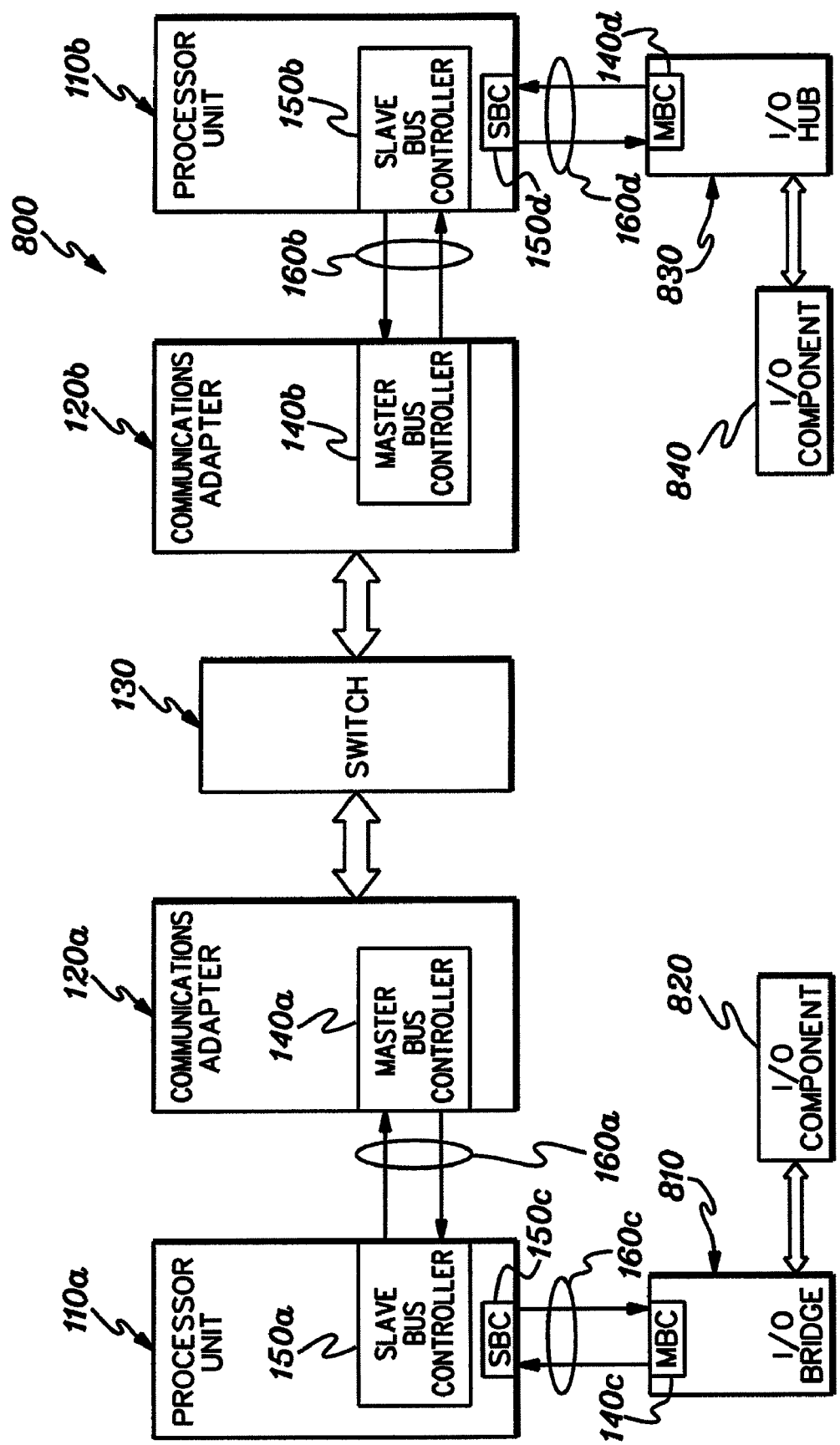
FIG. 8 illustrates an example of a computing environment in which a processor unit utilizes more than one pair of unidirectional, point-to-point buses to communicate data between the processor unit and more than one component of the computing environment, in accordance with an aspect of the present invention.

FIG. 8 illustrates an example of a computing environment in which a processor unit utilizes more than one pair of unidirectional, point-to-point buses to communicate data between the processor unit and more than one component of the computing environment. Processor unit 110a of computing system 800 comprises slave bus controllers 150a and 150c, and processor unit 110b comprises slave bus controllers 150b and 150d. Computing system 800 of FIG. 8 is similar to computing system 100 of FIG. 1 in that processor unit 110a may communicate data with processor unit 110b through communications adapters 120a and 120b and switch 130. Processor units 110a and 110b utilize bus pairs 160a and 160b, respectively to communicate data with communications adapters 120a and 120b, respectively. In addition, slave bus controller 150c of processor unit 110a and master bus controller 140c of I/O bridge 810 provide a pair of unidirectional, point-to-point buses, in accordance with an aspect of the present invention, to communicate data between processor unit 110a and I/O component 820. Similarly, slave bus controller 150d of processor unit 110b and master bus controller 140d of I/O hub 820 provide a pair of unidirectional, point-to-point buses, in accordance with an aspect of the present invention, to communicate data between processor unit 110b and I/O component 840.

Figure 9:
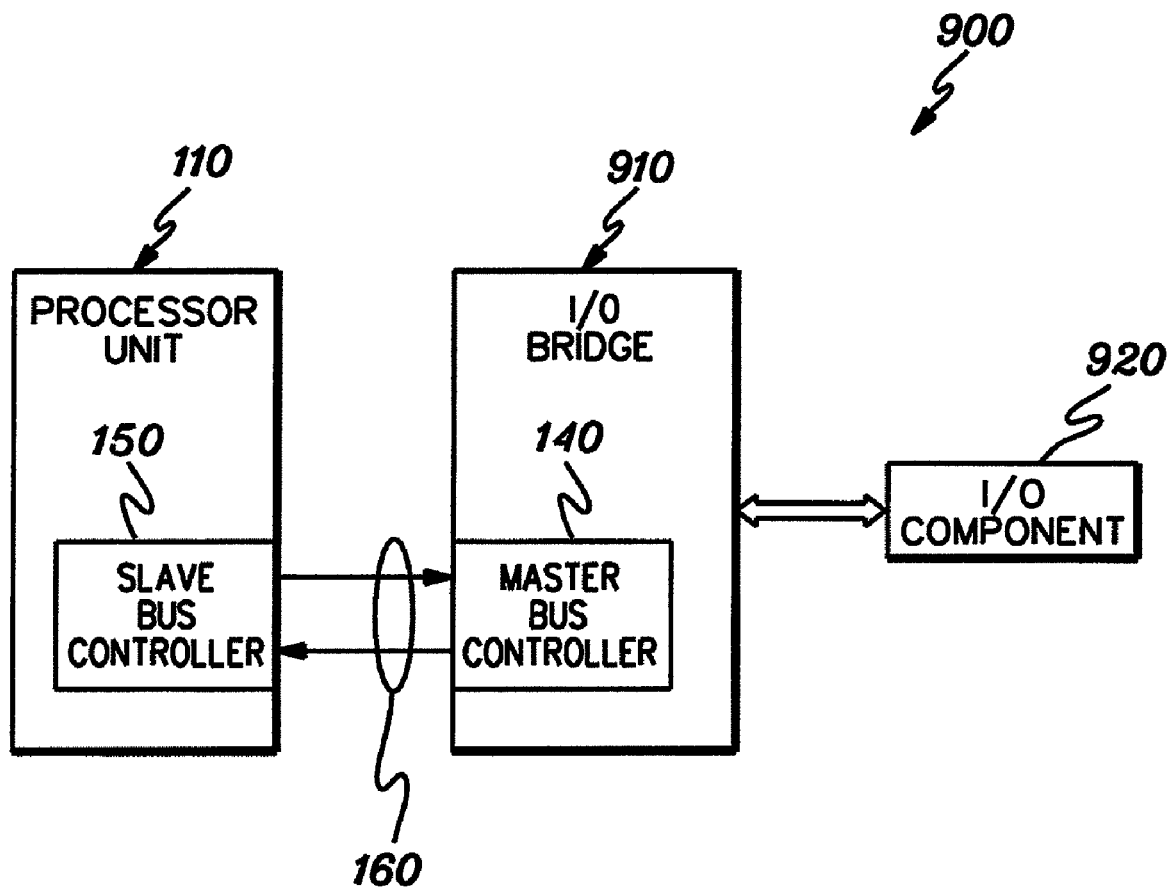
FIG. 9 illustrates another exemplary computing environment wherein a processor unit utilizes a pair of unidirectional, point-to-point buses to communicate with an input/output component of the computing environment via an input/output bridge, in accordance with an aspect of the present invention.

FIG. 9 illustrates another exemplary computing environment wherein a processor unit utilizes a pair of unidirectional, point-to-point buses, in accordance with an aspect of the present invention, to communicate with an input/output component of the computing environment via an input/output bridge. In computing system 900, processor unit 110 comprises slave bus controller 150, and input/output bridge 910 comprises master bus controller 140. Input/output bridge 910 and processor unit 110 communicate data using bus pair 160 via master bus controller 140 and slave bus controller 150. As illustrated in FIG. 9, bus pair 160 comprises an output bus and an input bus. The output bus is a unidirectional, point-to-point bus for transmitting data from master bus controller 140 to slave bus controller 150 as described above, and input bus is a unidirectional, point-to-point bus for transmitting data from slave bus controller 150 to master bus controller 140 as described above. Since input/output bridge 910 is coupled to input/output component 920, processor unit 110 may transmit data to or receive data from input/output component 920.

Figure 10:
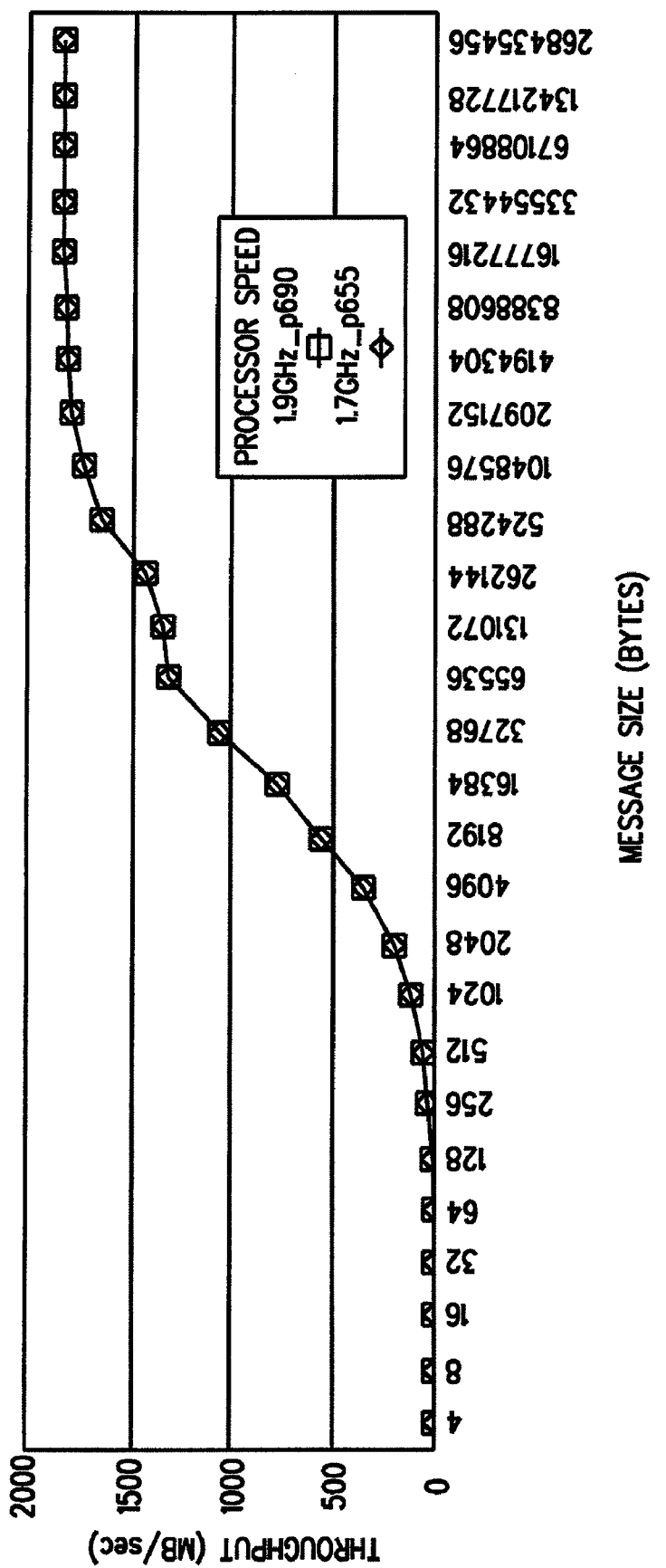
FIG. 10 illustrates a plot of the throughput versus message size over the outbound bus of a pair of unidirectional, point-to-point buses, in accordance with the present invention, for one exemplary computing environment.

FIG. 10 illustrates two plots of the throughput versus message size over the output bus of a pair of unidirectional, point-to-point buses, in accordance with the present invention, obtained for one exemplary computing environment with processors operating at 1.7 GHz and 1.9 GHz. The measured throughput data in FIG. 10 indicate that the effect of command and control information transmitted in accordance with the protocol utilized in by the pair of unidirectional, point-to-point buses becomes less significant as the message size increases beyond 8192 bytes.

The capabilities of one or more aspects of the present invention can be implemented in firmware or hardware or some combination thereof.

One or more aspects of the present invention can be included in an article of manufacture (e.g., one or more computer system products or computing system components such as a communications adapter). The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of interfacing two components of a computing system, wherein the method comprises:
   providing a pair of unidirectional, point-to-point buses to transmit data between a master bus controller of a computing system and a slave bus controller of a processor unit of the computing system absent bus selection arbitration, wherein the pair of unidirectional, point-to-point buses comprises
      a unidirectional, point-to-point output bus to transmit data from the master bus controller to the slave bus controller and
      a unidirectional, point-to-point input bus to transmit data from the slave bus controller to the master bus controller,
      wherein the master bus controller initiates a transmission of the data between the master bus controller and the slave bus controller, the master bus controller being coupled to a component of the computing system, and the slave bus controller being coupled to a component of the processor unit of the computing system;
   providing means for transmitting a command packet, comprising a command, an address and any data, the address being associated with data pertaining to the command, from the master bus controller to the slave bus controller on the unidirectional, point-to-point output bus;
   providing means for determining by the slave bus controller whether the slave bus controller can accept the command; and
   providing means for transmitting during a first input bus signaling interval one of an acknowledgement (ACK) signal or a non-acknowledge (NACK) signal from the slave bus controller to the master bus controller via the unidirectional, point-to-point input bus responsive to the slave bus controller receiving a first output bus signaling interval comprising command and control information for the command packet on the unidirectional, point-to-point output bus and before the slave bus controller receives a subsequent output bus signaling interval comprising data of the command packet on the unidirectional, point-to-point output bus, wherein the acknowledge (ACK) signal is transmitted if the determining indicates that the slave bus controller can accept the command packet and the not-acknowledge (NACK) signal is transmitted if the determining indicates that the slave bus controller can not accept the command packet.

2. The method of claim 1, wherein:
   the command packet further comprises a block of data;
   the transmitting the command packet spans a plurality of signaling intervals of the unidirectional, point-to-point output bus;
   and the method further comprises
      providing means for utilizing a signal link of the unidirectional, point-to-point output bus to transmit a bit of the address in a signaling interval of the plurality of signaling intervals, and
      providing means for utilizing the signal link to transmit a bit of the block of data in another signaling interval of the plurality of signaling intervals.

3. The method of claim 1, wherein the method further comprises:
   providing means for transmitting a response packet from the slave bus controller to the master bus controller via the unidirectional, point-to-point input bus, after the transmitting the acknowledgement (ACK) signal, the response packet comprising a response command, and the response command providing a representation that an action associated with the command of the command packet has been completed.

4. The method of claim 1, wherein the method further comprises:
   providing means for transmitting a response packet from the slave bus controller to the master bus controller via the unidirectional, point-to-point input bus, after the transmitting the acknowledgement (ACK) signal,
      the response packet comprising a response command and a block of data associated with the address, and
      the transmitting the response packet spanning a plurality of signaling intervals of the unidirectional, point-to-point input bus;
   providing means for utilizing a signal link of the unidirectional, point-to-point input bus to transmit a bit of the response command in a signaling interval of the plurality of signaling intervals, and providing means for utilizing the signal link to transmit a bit of the block of data in another signaling interval of the plurality of signaling intervals.

5. The method of claim 1, wherein the method further comprises providing means for controlling flow on the unidirectional, point-to-point output bus by the master bus controller, wherein the controlling flow comprises monitoring a number of buffers of the slave bus controller in use, transmitting another command packet after transmission of the command packet if all of the buffers of the slave bus controller are not in use, and if all of the buffers are in use, delaying a transmission of the another command packet until at least one of the buffers of the slave bus controller is not in use.

6. The method of claim 5, wherein the means for controlling flow further comprises:

means for tagging the command by including a tag in the command packet transmitted from the master bus controller to the slave bus controller;

means for including the tag in a response packet transmitted from the slave bus controller to the master bus controller; and means for detecting the tag in the response packet received on the unidirectional, point-to-point input bus; and means for interpreting detection of the tag in the response packet received on the unidirectional, point-to-point input bus as an indication that a buffer of the slave bus controller is no longer in use.

7. The method of claim 1, wherein the method further comprises providing means for forwarding, by the slave bus controller, the address to a target component for the command after the slave bus controller receives the address on the unidirectional, point-to-point output bus, and before the slave bus controller has received all of the command packet.

8. The method of claim 1, wherein the method further comprises:

providing means for retransmitting the command packet from the master bus controller to the slave bus controller on the unidirectional, point-to-point output bus if the master bus controller does not receive one of the acknowledgement (ACK) signal or the not-acknowledge (NACK) signal from the slave bus controller on the unidirectional, point-to-point input bus within a predetermined time; and providing means for automatically determining the predetermined time by counting a number of clock intervals from a transmission of a null command packet on the unidirectional, point-to-point output bus by the master bus controller until the master bus controller receives an acknowledgement of the null command packet from the slave bus controller on the unidirectional, point-to-point input bus.

9. The method of claim 1, wherein the command packet further comprises a tag identifying the command, and wherein the providing means for transmitting further comprises providing means for transmitting during a subsequent input bus signaling interval a response command packet, the response command packet comprising the tag from the command packet on the unidirectional, point-to-point output bus.

* * * * *